United States Patent
Shum et al.

(10) Patent No.: US 11,646,663 B1
(45) Date of Patent: May 9, 2023

(54) ADAPTIVE DEAD-TIME CONTROL OF A SYNCHRONOUS BUCK CONVERTER

(71) Applicant: Hong Kong Applied Science and Technology Research Institute Company Limited, Hong Kong (HK)

(72) Inventors: Tak Lok Shum, Hong Kong (HK); Xiaoyong Hu, Shenzhen (CN); Yuxie Cheng, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 17/680,288

(22) Filed: Feb. 25, 2022

(51) Int. Cl.
  *H02M 3/158* (2006.01)
  *H02M 1/38* (2007.01)
  *H02M 1/36* (2007.01)

(52) U.S. Cl.
  CPC ............. *H02M 3/158* (2013.01); *H02M 1/36* (2013.01); *H02M 1/38* (2013.01)

(58) Field of Classification Search
  CPC ............. H02M 1/0048; H02M 1/0054; H02M 3/158; H02M 3/156; H02M 1/38; H02M 1/36; H02M 3/1566
  See application file for complete search history.

(56) References Cited

U.S. PATENT DOCUMENTS

| | | | |
|---|---|---|---|
| 9,577,525 B2 | 2/2017 | Biondi et al. | |
| 9,590,492 B2 * | 3/2017 | Chang | H02M 1/36 |
| 10,205,381 B1 * | 2/2019 | Vinciarelli | H02M 3/158 |
| 10,951,207 B1 * | 3/2021 | Chiu | H03K 5/1565 |
| 2003/0142521 A1 * | 7/2003 | Hosotani | H02M 1/40 363/100 |
| 2009/0146630 A1 * | 6/2009 | Naka | H02M 3/1588 323/283 |

(Continued)

FOREIGN PATENT DOCUMENTS

| | | |
|---|---|---|
| CN | 108377094 A | 8/2018 |
| CN | 109004830 A | 12/2018 |

(Continued)

OTHER PUBLICATIONS

ISR and Written Opinion, PCT/CN2022/078707, dated Sep. 7, 2022.

(Continued)

*Primary Examiner* — Gustavo A Rosario-Benitez
(74) *Attorney, Agent, or Firm* — g Patent LLC; Stuart T. Auvinen (57) ABSTRACT

A start-up routine for a Switched-Mode Power Supply (SMPS) gradually increases the duty cycle while reducing an initial dead time to a final optimal dead time for normal operation. Reliability is improved by the larger initial dead time that reduces ringing in switching transistors during low-voltage conditions early in the start-up sequence. Efficiency is improved by reducing the optimal dead time as voltages approach operating levels. The initial dead time is pre-calculated as a function of the input voltage and initial duty cycle. Optimal dead times are pre-calculated as a function of output voltage and output current. The optimal dead time is adjusted for each iteration of a second loop that also increases duty cycle until the target operating output voltage is reached. Pre-calculated dead times are based on the time required to fully charge and discharge parasitic drain-to-source capacitances in the switching transistors in the SMPS circuit.

14 Claims, 11 Drawing Sheets

(56) References Cited

U.S. PATENT DOCUMENTS

| | | | | |
|---|---|---|---|---|
| 2009/0146633 | A1* | 6/2009 | Karasawa | H02M 3/1588 323/290 |
| 2011/0095732 | A1* | 4/2011 | Park | G05F 1/70 323/207 |
| 2015/0256060 | A1* | 9/2015 | Faingersh | H02M 1/36 323/267 |
| 2015/0256074 | A1 | 9/2015 | Biondi et al. | |
| 2015/0263602 | A1* | 9/2015 | Drda | H02M 1/08 363/21.02 |
| 2015/0334795 | A1* | 11/2015 | Strijker | H01L 27/0262 315/291 |
| 2015/0349636 | A1* | 12/2015 | Bodano | H02M 1/32 323/271 |
| 2016/0329807 | A1* | 11/2016 | Daly | H02M 1/32 |
| 2017/0149335 | A1* | 5/2017 | Morroni | H02M 3/158 |
| 2017/0187284 | A1* | 6/2017 | Vaidya | H02M 1/38 |
| 2017/0366080 | A1* | 12/2017 | Chang | H02M 1/088 |
| 2018/0131282 | A1* | 5/2018 | Chen | H03K 17/04123 |
| 2021/0211040 | A1 | 7/2021 | Rainer et al. | |
| 2022/0376598 | A1* | 11/2022 | Lewis | H02M 1/08 |

FOREIGN PATENT DOCUMENTS

| | | |
|---|---|---|
| CN | 113098280 A | 7/2021 |
| JP | 2005210820 A | 8/2005 |

OTHER PUBLICATIONS

Marzieh Ekhtiari et al., "Dynamic Optimum Dead Time in Piezo-electric Transformer-based Switch-Mode Power Supplies", IEEE Trans Power Elect. 31, Jan. 2017.

Bingyao Sun, "Does GaN Have a Body Diode?—Understanding the Third Quadrant Operation of GaN", Texas Instruments Application report SNOAA36, Feb. 2019.

Yuchang Zhang, Jason Wang, "Understanding Dead-time Based on TPS51225/275/285", Texas Instruments Application report SLUA919, Aug. 2018.

Markus Zehendner, Matthias Ulmann, "Power Topologies Handbook", Texas Instruments Application report SLYU036, 2016, pp. 1-79.

\* cited by examiner

ADAPTIVE DEAD-TIME CONTROL OF A SYNCHRONOUS BUCK CONVERTER

FIELD OF THE INVENTION

This invention relates to power converters, and more particularly to a start-up routine to prevent ringing in a Switched-Mode Power Supply (SMPS).

BACKGROUND OF THE INVENTION

Power converters such as DC-DC converters are in widespread use. A Switched-Mode Power Supply (SMPS) rapidly switches transistors on and off to charge an output capacitor to a desired output voltage. Controlling this switching to obtain the desired output voltage with efficiency, especially when powering up the converter may be difficult.

Figure 1:
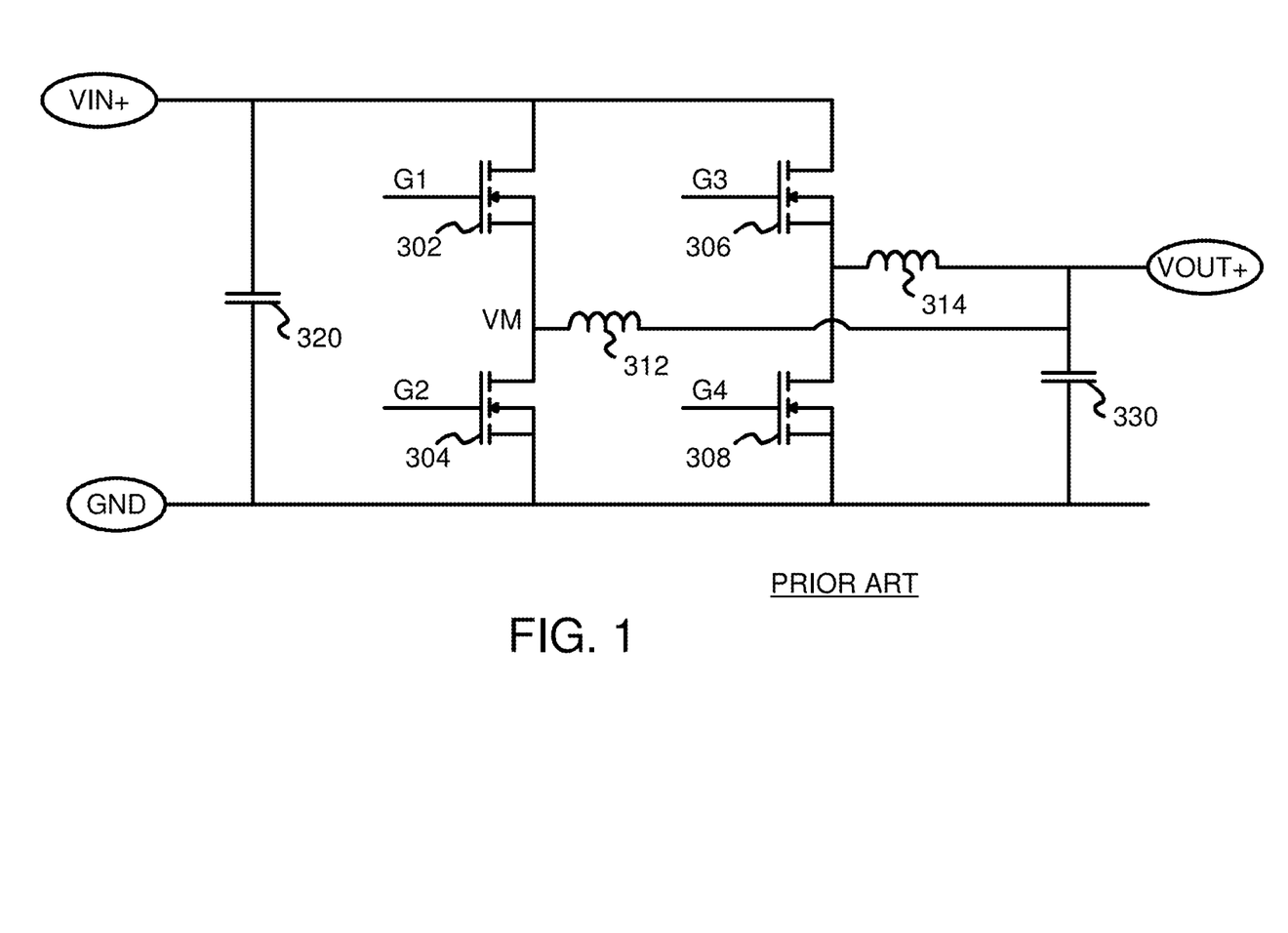
FIG. 1 shows a prior-art Switched-Mode Power Supply (SMPS).

FIG. 1 shows a prior-art Switched-Mode Power Supply (SMPS). An input supply voltage VIN+ is to be converted to an output supply voltage VOUT+. a common ground GND is used for both input and outputs, but some systems have separate grounds.

Input capacitor 320 between VIN+ and GND filters the input to the drains of pull-up transistors 302, 306, while ground is connected to the sources of pull-down transistors 304, 308. The source of pull-up transistor 302 and the drain of pull-down transistor 304 are connected together to drive VOUT+ through inductor 312 to charge output capacitor 330.

The gate G1 of pull-up transistor 302 is driven high to turn on transistor 302 for a period of time to charge output capacitor 330. Once G1 is driven low, the gate of pull-down transistor 304 is driven high to discharge output capacitor 330. The signals for G1, G2 are typically clocks in the kHz frequency range, and the duty cycles are adjusted to obtain the desired output voltage VOUT+ for a particular input voltage VIN+. For example, by increasing the high time (duty cycle) for G1 relative to that of G2, a higher VOUT+ may be obtained.

Similarly, the source of pull-up transistor 306 and the drain of pull-down transistor 308 are connected together to drive VOUT+ through inductor 314 to charge output capacitor 330. The switching signals applied to the gates of transistors 306, 308 can be 180 degrees out-of-phase with the switching signals driving the gates of transistors 302, 304 for reduced output ripple.

Transistors 302, 304, 306, 308 could be n-channel Metal-Oxide-Semiconductor Field-Effect Transistors (MOSFET), but more recently Gallium-Nitride (GaN) transistors are being used since they can supply a much higher current for a given physical transistor size. GaN transistors have allowed for higher density power-converter modules, since a higher power current can be provided using GaN devices for a given size. The smaller input capacitance of GaN transistors compared to MOS transistors provides a faster switching response time that can enable higher frequency applications. Lower switching loss can result in better efficiency.

Figure 2:
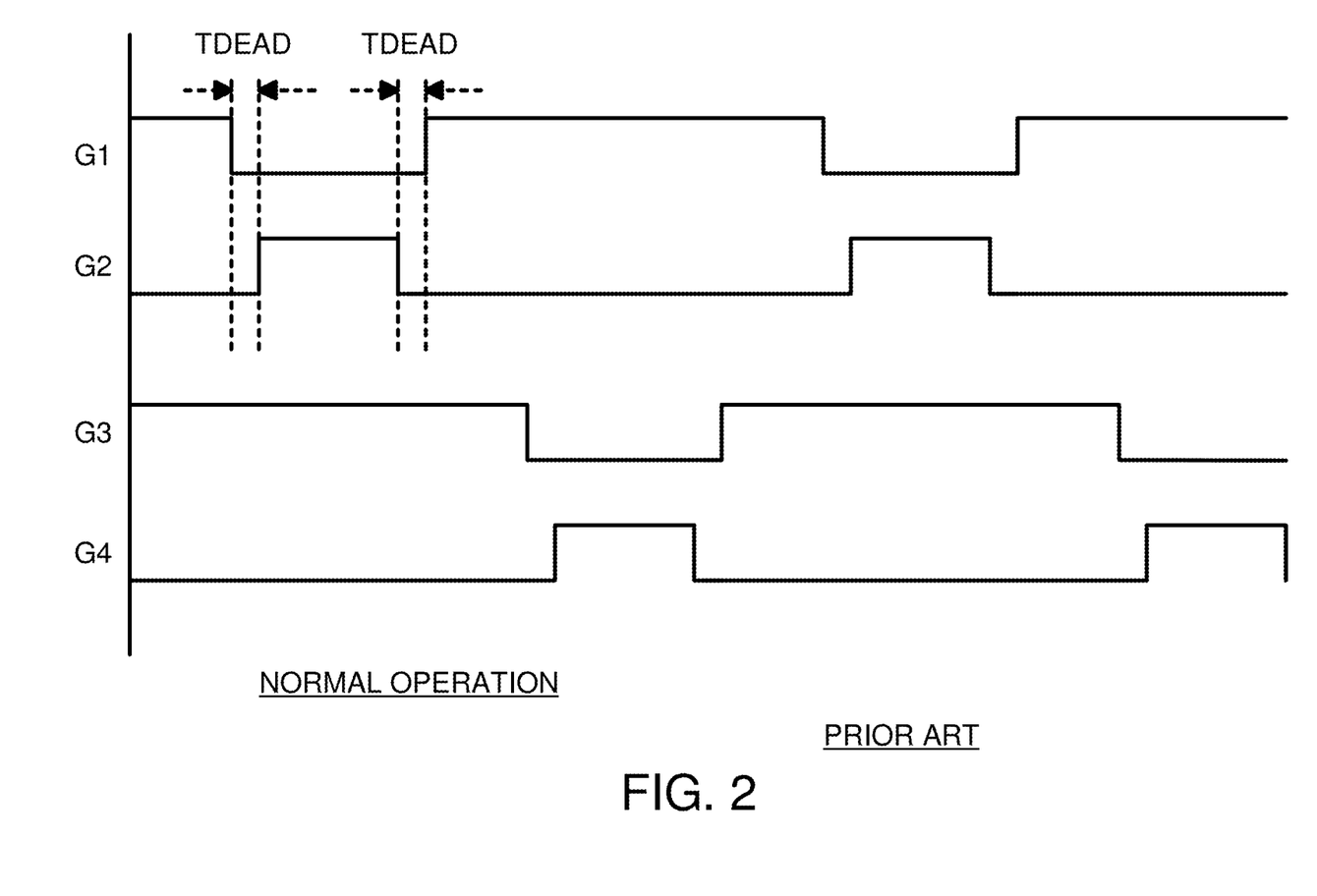
FIG. 2 is a waveform showing operation of the SMPS of FIG. 1.

FIG. 2 is a waveform showing operation of the SMPS of FIG. 1. The gate voltage G1 of transistor 302 pulses high to charge output capacitor 330, while later the gate voltage G2 of transistor 304 pulses high to discharge output capacitor 330. The waveforms of G3 and G4 have a phase delay of 180 degrees compared to that for G1, G2.

To prevent both transistors 302, 304 from being turned on at the same time, a dead time TDEAD is added before G2 rises, and before G1 rises. Although these dead times could differ, usually they are set to the same values. This dead time prevents a power-to-ground current path if both transistors 302, 304 were turned on at the same time. A high current spike and possible heating and damage of transistors 302, 304 could occur if the dead time were not added or was too short. A long dead time is undesirable since it reduces the pulse-high time available for any given switching frequency; thus efficiency is reduced as dead time increases.

Figure 3:
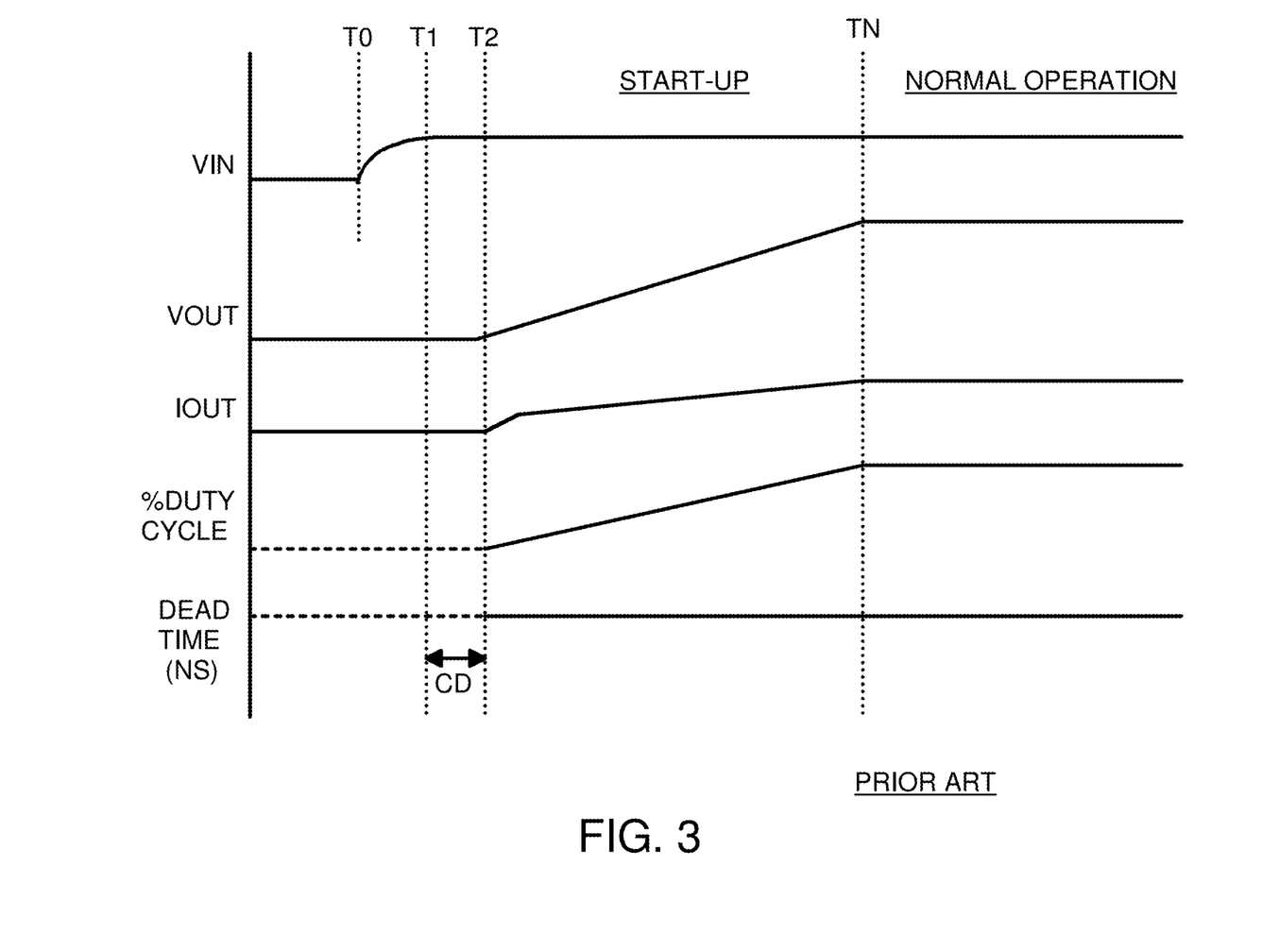
FIG. 3 is a waveform of start-up of the SMPS of FIG. 1.

FIG. 3 is a waveform of start-up of the SMPS of FIG. 1. Starting up the operation of a SMPS can be tricky. When power is switched on at time T0, voltages and currents are initially zero. The input voltage VIN generated by a system power supply rises until a sufficiently high value is reached at time T1, such as being within 5% of the target steady-state input voltage. Then a Cool-Down (CD) delay is provided before the SMPS is turned on a time T2. G1-G4 begin switching but with a low duty cycle that gradually increases until time TN. As this duty cycle increases, both the output voltage VOUT and the output current IOUT increase. Finally at time TN, the duty cycle remains mostly constant, and VOUT has reached the target output voltage. Normal operation can now occur after time TN.

Figure 4:
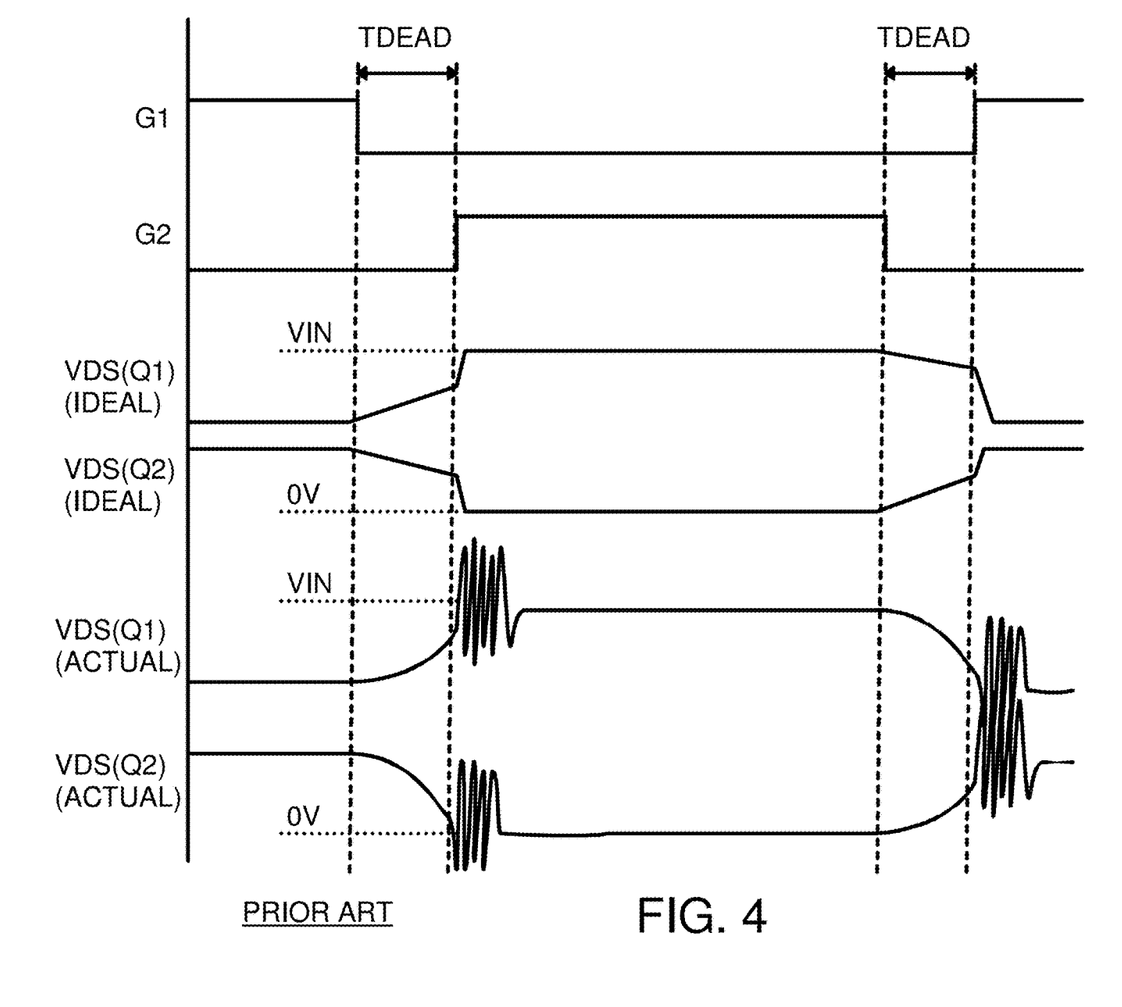
FIG. 4 is a waveform showing a ringing problem that can occur during start-up when GaN transistors are used in a SMPS.

FIG. 4 is a waveform showing a ringing problem that can occur during start-up when GaN transistors are used in a SMPS. Simply replacing MOS transistors with GaN transistors in a SMPS can lead to problems. The inventors have noticed a problem with ringing during start-up of the SMPS when GaN transistors are used.

When G1 falls, turning off transistor 302, current continues to flow during this first dead time due to inductor 312 resisting a sudden change in current flow. The energy stored in the magnetic field around inductor 312 is released back into the circuit. The voltage across inductor 312 is now in reverse polarity to the voltage across inductor 312 during the 'on' period, and current flow is forced through the body diode of transistor 304 for a short time. Then transistor 304 will be switched on to keep providing current for the load.

The voltage across pull-up transistor 302, VDS(Q1), is close to zero when G1 is high and transistor 302 is on and G2 is low, transistor 304 is off. VDS(Q1) starts to rise when G1 is changed to low, turning off transistor 302. The voltage across pull-down transistor 304, VDS(Q2), is large when G2 is low, turning off transistor 304. G1 going high turns on transistor 304, but VDS(Q2) starts to fall when G1 is changed to low, turning off transistor 302. Current is pulled from middle node VM between transistors 302, 304 by inductor 312.

This current during the first dead time charges the parasitic drain-to-source capacitor in transistor 302 (VDS Q1) and discharges the parasitic drain-to-source capacitor in transistor 304 (VDS Q2).

When G2 goes high and turns on pull-down transistor 304, the first dead time ends and (VDS Q2) quickly drops to zero. The middle node VM voltage drops to zero, causing the parasitic capacitor of pull-up transistor 302 to be charged and VDS Q1 to rise to a high value.

The actual waveforms for VDS Q1 and VDS Q2 are more complex. The inventors have noted ringing that occurs in simulations when G2 goes high and pull-down transistor 304 turns on if the VDS of transistor 304 has not dropped to Zero or VDS of transistor 302 has not risen to Vin during dead time. This ringing on middle node VM and of the drain-to-source voltages of transistors 302, 304 is thought to be caused by a resonant circuit of inductor 312 and the parasitic capacitances and inductances of transistors 302, 304.

This ringing is undesirable since the high ringing currents can spike and potentially damage the GaN transistors and other components. The high ringing may cause both sides of VGS to ring as well, and may erroneously trigger the turn on of the other side the GaN transistor. The reliability of the SMPS can be diminished due to this start-up ringing. Such ringing is notoriously hard to detect and observe, making such reliability problems even more difficult to resolve.

The inventors note that this ringing occurs for shorter values of the dead time. The ringing can be reduced or eliminated with longer values of the dead time. However, a larger dead time reduces the efficiency of the SMPS. Thus selecting a larger dead time to prevent ringing is undesirable.

What is desired is a start-up process for a SMPS. A start-up procedure that dynamically adjusts dead time as conditions change during start-up is desired. A start-up procedure to reduce ringing of GaN transistors as the SMPS powers up to higher output voltages is desirable.

DETAILED DESCRIPTION

The present invention relates to an improvement in SMPS start-up. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have noticed ringing that occurs in simulations when G2 goes high and pull-down transistor 304 (FIG. 1) turns on. This ringing on middle node VM and of the drain-to-source voltages of transistors 302, 304 is thought to be caused by a resonant circuit of inductor 312 and the parasitic capacitances and inductances of transistors 302, 304.

The inventors further note that this ringing occurs for shorter values of the dead time. The ringing can be reduced or eliminated with longer values of the dead time. Elimi-nating the ringing increases long-term reliability. However, a larger dead time is undesirable since it reduces the efficiency of the SMPS.

The inventors theorize that for short dead times, the parasitic drain-to-source capacitances of transistors 302, 304 are not being fully charged or discharged during this dead time. The inventors propose to adjust the dead time to be sufficiently long to fully charge and discharge these parasitic drain-to-source capacitances.

However, the dead time required to fully charge and discharge these parasitic capacitances are complex functions of circuit conditions, such as the input voltage, output voltage, and output current, as well as the duty cycle. These circuit conditions are changing during start-up.

The inventors have developed a start-up procedure (FIGS. 7A-7B) that selects an initial dead time (FIG. 8) based on the input voltage and initial duty cycle when the SMPS is first activated during start up. Then as the duty cycle is increased and the output voltage rises to reach a first target, the dead time is adjusted as a function of the output voltage and output current as the duty cycle continues to be increased.

These functions (FIGS. 8, 9) are pre-calculated based on the dead time required to fully charge and discharge the parasitic drain-to-source capacitances in the GaN transistors in the SMPS circuit. The calculations can be performed using circuit simulation software such as MATLAB given the size and estimated parasitic capacitance and inductance of the GaN transistors and other circuit components, the input voltage, output voltage, and output current, and applied operating parameters such as the current duty cycle.

Figure 5:
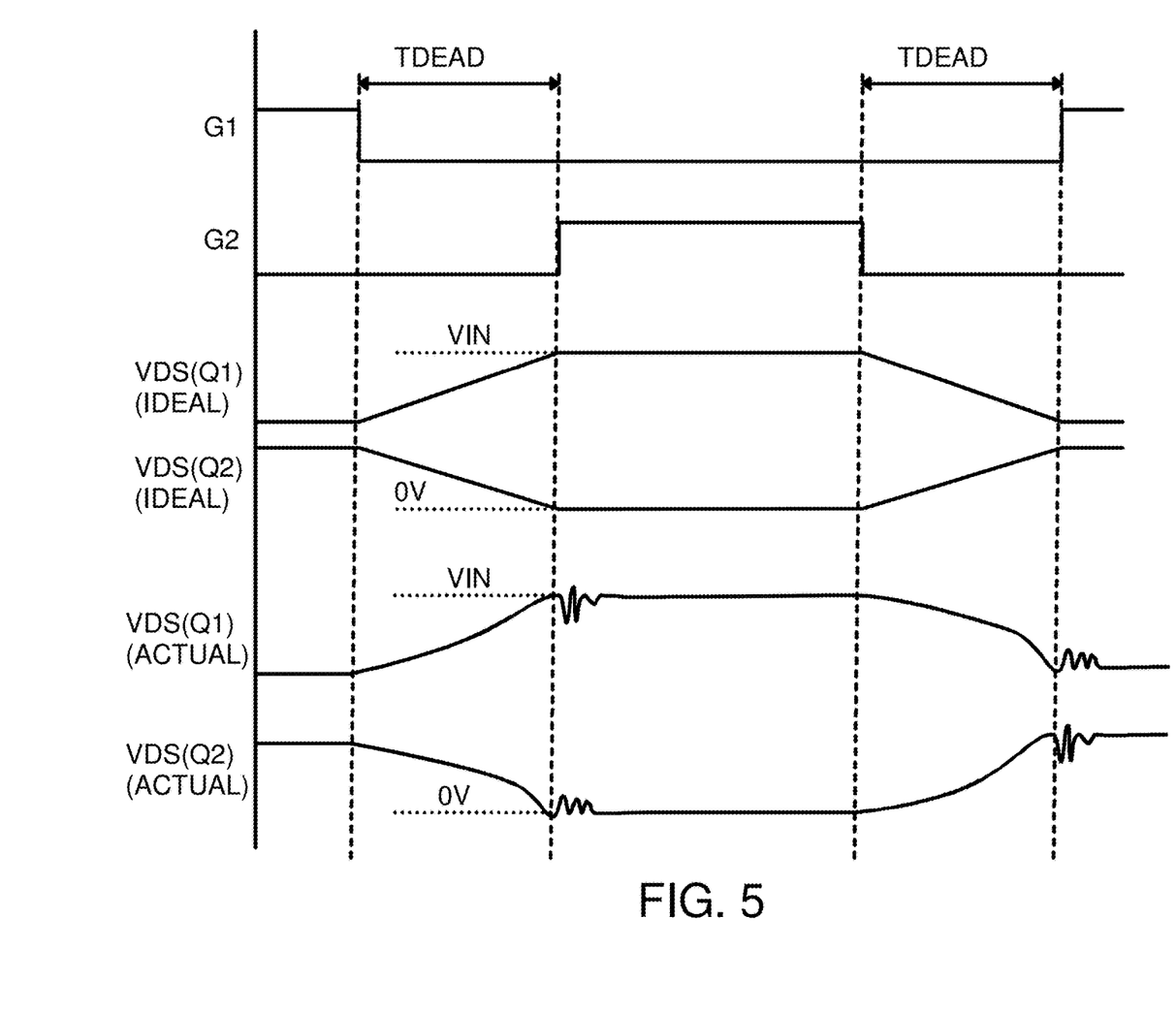
FIG. 5 is a waveform showing reduced ringing when the start-up procedure of FIGS. 7A-7B is implemented.
Figure 7A:
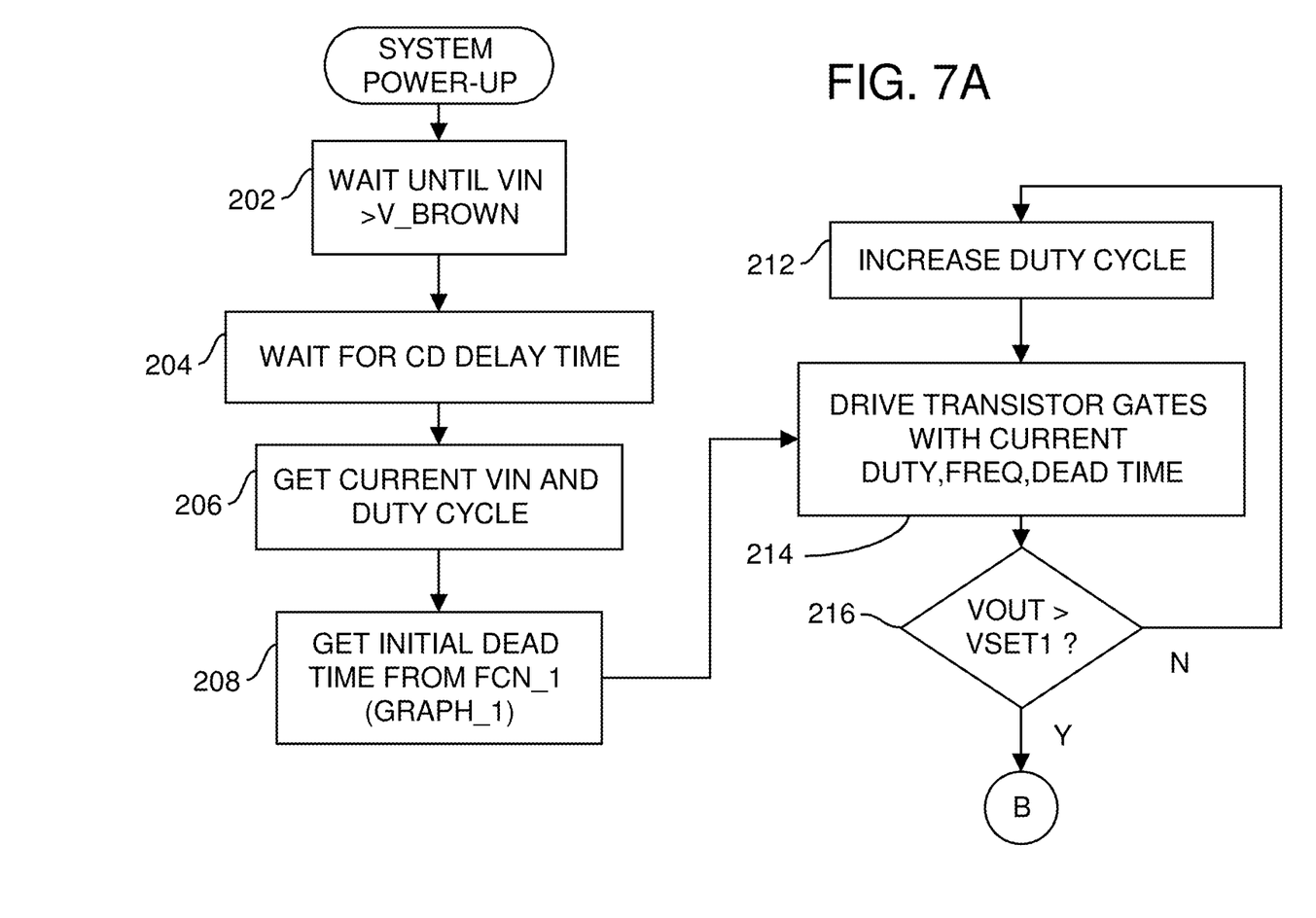
FIGS. 7A-7B show a flowchart for a SMPS start-up procedure that optimizes dead time to reduce ringing as the duty cycle increases.
Figure 7B:
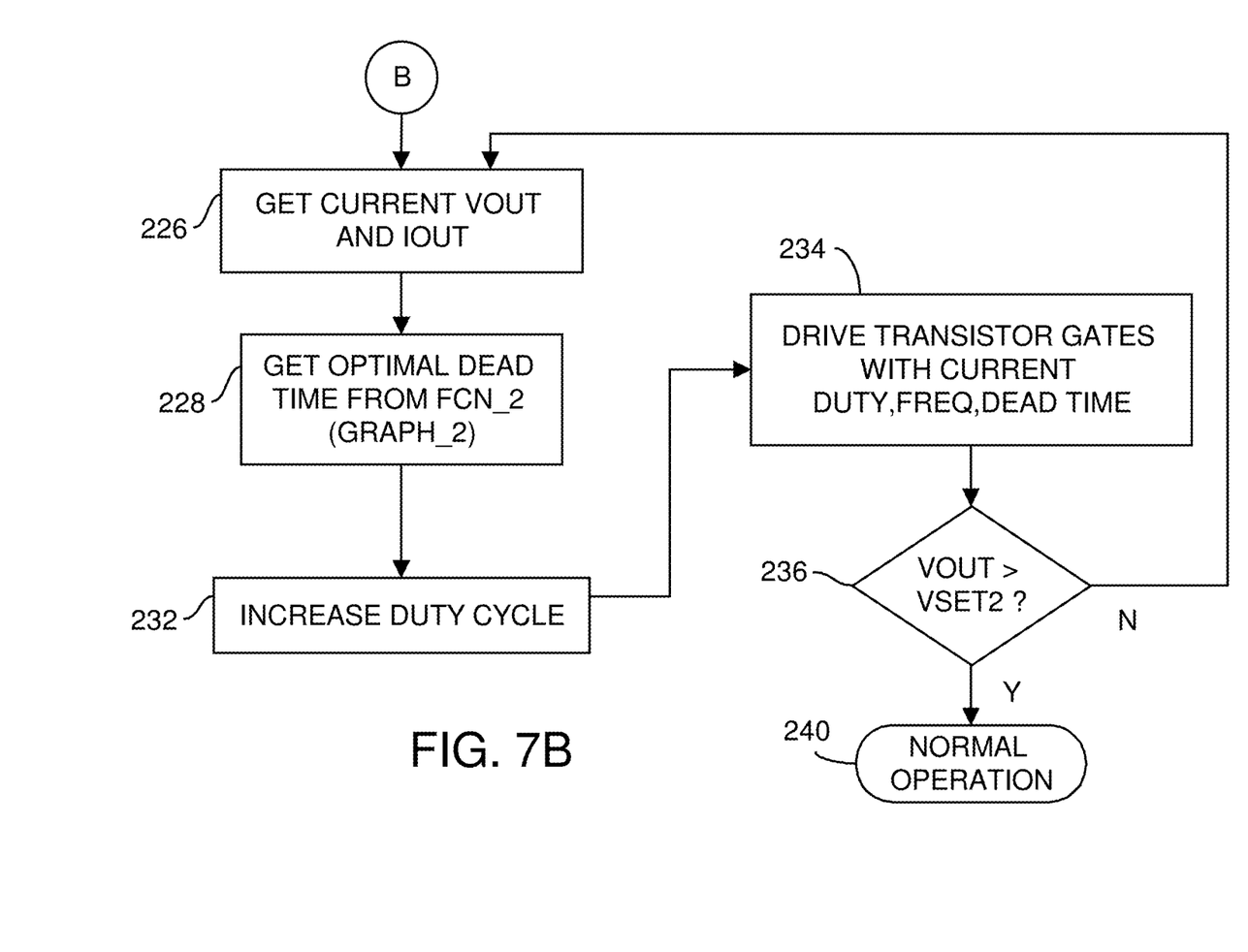

FIG. 5 is a waveform showing reduced ringing when the start-up procedure of FIGS. 7A-7B is implemented. The dead time TDEAD is initially selected as a longer value that what is efficient for normal operation. However, this longer dead time provides a sufficient time to fully charge and discharge the parasitic drain-to-source capacitances in the GaN transistors in the SMPS circuit. This longer dead time allows these parasitic capacitances to fully charge and discharge, resulting in less ringing on the actual VDS(Q1) and VDS(Q2) waveforms when compared to the shorter dead time of FIG. 4.

Figure 6:
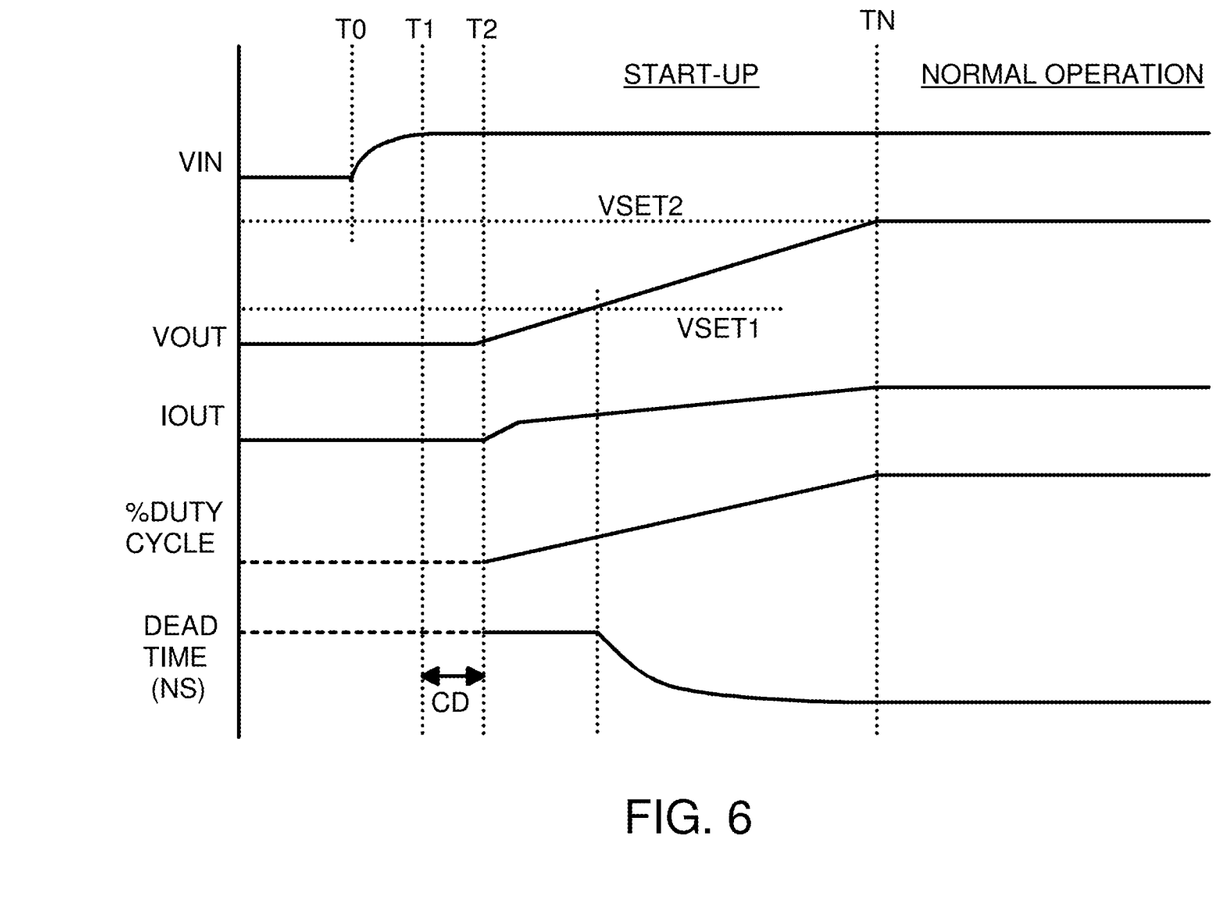
FIG. 6 is a waveform of start-up of the SMPS of FIG. 1.

FIG. 6 is a waveform of start-up of the SMPS of FIG. 1 using the procedure of FIGS. 7A-7B. When power is switched on at time T0, voltages and currents are initially zero. The input voltage VIN generated by a system power supply rises until a sufficiently high value is reached at time T1, such as being within 5% of the target steady-state input voltage. Then a Cool-Down (CD) delay is provided before the SMPS is turned on a time T2. G1-G4 begin switching but with a low duty cycle that gradually increases until time TN. As this duty cycle increases, both the output voltage VOUT and the output current IOUT increase.

The dead time is initially set to a high value at time T2 when the SMPS is first turned on and VOUT and IOUT are low. The lower value of VOUT tends to produce more ringing than higher values of VOUT and IOUT. The initial dead time is used and remains constant as the duty cycle gradually increases and the first process loop of FIG. 7A is executed.

Once the output voltage VOUT reaches a first target, the second loop of FIG. 7B is executed as the duty cycle continues to be raised. The optimal dead time for the current conditions of VOUT and IOUT are determined from the function or graph of FIG. 9 for each iteration of the second loop. This optimal dead time decreases as the output current and output voltage continue to increase with the increasing duty cycle. Once the output voltage reaches a second target, at time TN, start-up ends and normal operation of the SMPS occurs. The duty cycle remains mostly constant during normal operation but may be slightly adjusted to maintain the target VOUT as temperature, supply voltage, or other conditions fluctuate.

FIGS. 7A-7B show a flowchart for a SMPS start-up procedure that optimizes dead time to reduce ringing as the duty cycle increases. In FIG. 7A, when the system is powered up, the input voltage VIN rises from zero and may be unstable or too low to safely use. After the input voltage VIN reaches a brown-in voltage V_BROWN, step 202, and additional Cool-Down (CD) delay is allowed to elapse to ensure that VIN is stable, step 204, before the input voltage VIN is measured, step 206, and the initial duty cycle that is used by a controller to generate G1-G4 is obtained, such as from firmware. The initial duty cycle may be chosen according to the topology of the circuit application. For example, the initial duty cycle of a LLC resonant converter may be 50%, while the initial duty cycle for a Buck converter may be <1%.

Using the measured VIN and initial duty cycle, the initial dead time to use is obtained from a first function, step 208. This first function can be stored in a look-up table of function results. These first function results are shown graphically in FIG. 8 and can be pre-computed and stored in firmware for a range of possible values of VIN and initial duty cycle.

A controller generates gate signals G1-G4 at a predetermined frequency, with the initial duty cycle, step 214. These gate signals G1-G4 are applied to GaN transistors 302-308 (FIG. 1). The controller or other logic inserts the initial dead time obtained in step 208 before and after each pulse of G1-G4.

The controller continues to pulse G1-G4 for a period of time, allowing the SMPS to increase the output voltage by increasing the duty cycle as output capacitor 330 is charged by the output current. After some time the output voltage is measured and compared to a first output voltage target VSET1. When the output voltage is still below VSET1, step 216, then the first loop is repeated. The duty cycle is increased, step 212, and the controller adjusts the pulses of G1-G4, step 214, for the new duty cycle with the same frequency and initial dead time.

Eventually as the duty cycle increases and pull-up transistor 302 is pulsed on for a longer period of time, output voltage VOUT rises above first output voltage target VSET1. When the output voltage is above VSET1, step 216, then the first loop ends. The process continues with the second loop in FIG. 7B.

In FIG. 7B, the output current IOUT and output voltage VOUT are measured, step 226. Using the measured IOUT and VOUT, the optimal dead time to use is obtained from a second function, step 228. This second function can be stored in a look-up table of function results that are shown graphically in FIG. 9. Rather than compute the function results at start up or at runtime, they can be pre-computed and stored in firmware for a range of possible values of IOUT and VOUT.

The duty cycle is increased, step 232, and the controller adjusts the pulses of G1-G4, step 234, for the new optimal dead time and the newly increased duty cycle with the same frequency. These adjusted gate signals G1-G4 are applied to GaN transistors 302-308 (FIG. 1).

The controller continues to pulse G1-G4 for a period of time, allowing the SMPS to increase the output voltage by increasing the duty cycle as output capacitor 330 continues to be charged up by the output current. After some time the output voltage is measured and compared to a second output voltage target VSET2. When the output voltage is still below VSET2, step 236, then the second loop is repeated. VOUT and IOUT are measured, step 226, and used to obtain the optimal dead time, step 228, for the new conditions. The duty cycle is again increased, step 232, and the controller adjusts the pulses of G1-G4 generated, step 234.

Eventually as the duty cycle increases and pull-up transistor 302 is pulsed on for longer periods of time, output voltage VOUT rises above second output voltage target VSET2. When the output voltage is above VSET2, step 236, then the second loop ends. Normal operation 240 can commence. VOUT can be used by downstream devices.

Figure 8:
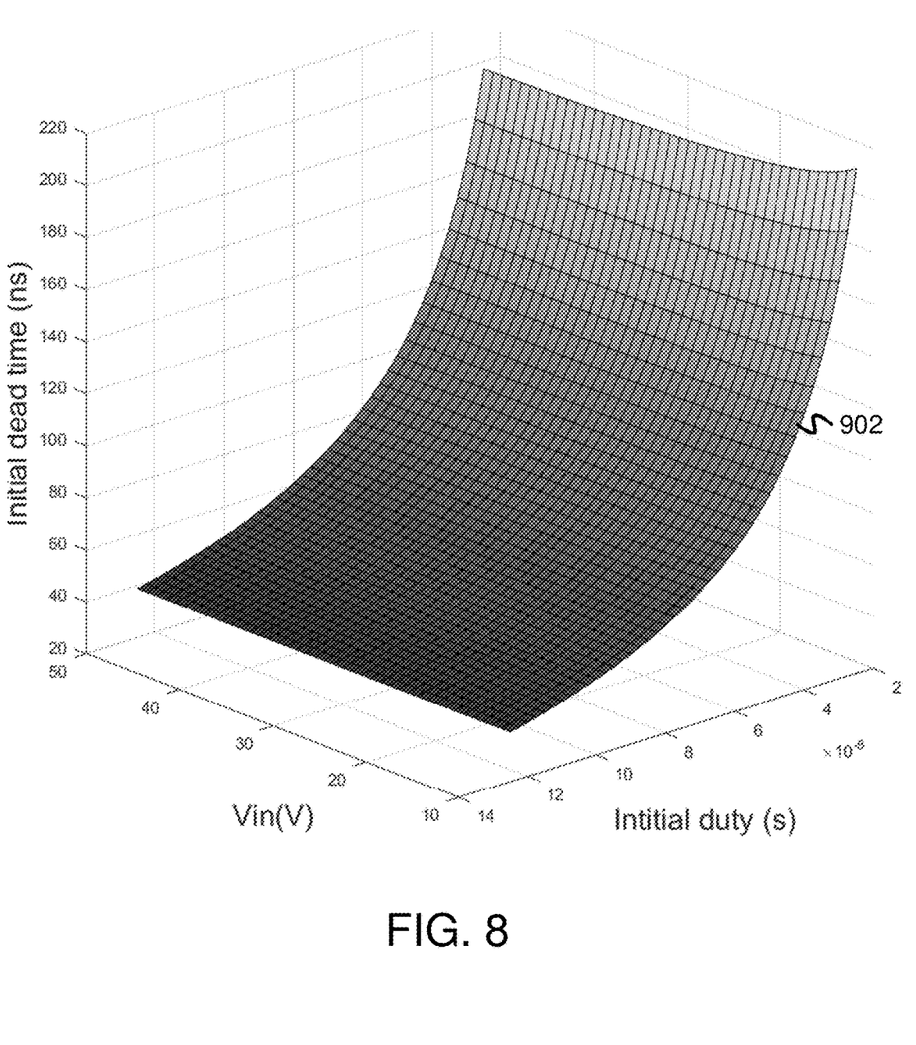
FIG. 8 is a plot of the first function to obtain the initial dead time.

FIG. 8 is a plot of the first function to obtain the initial dead time. The initial dead time is calculated as a first function of the initial duty cycle and the input voltage VIN. Surface 902 of the first function results shows that the initial dead time needed is higher for smaller initial duty cycles Lower values of VIN also require a slightly higher initial duty cycle than larger values of VIN, but this is a weaker dependency than initial duty cycle.

The result values of the first function are obtained by circuit simulation of FIG. 10 or using equation (4) shown later. The initial dead times are the time required to fully charge and discharge the parasitic drain-to-source capacitances in the GaN transistors in the SMPS circuit.

Figure 9:
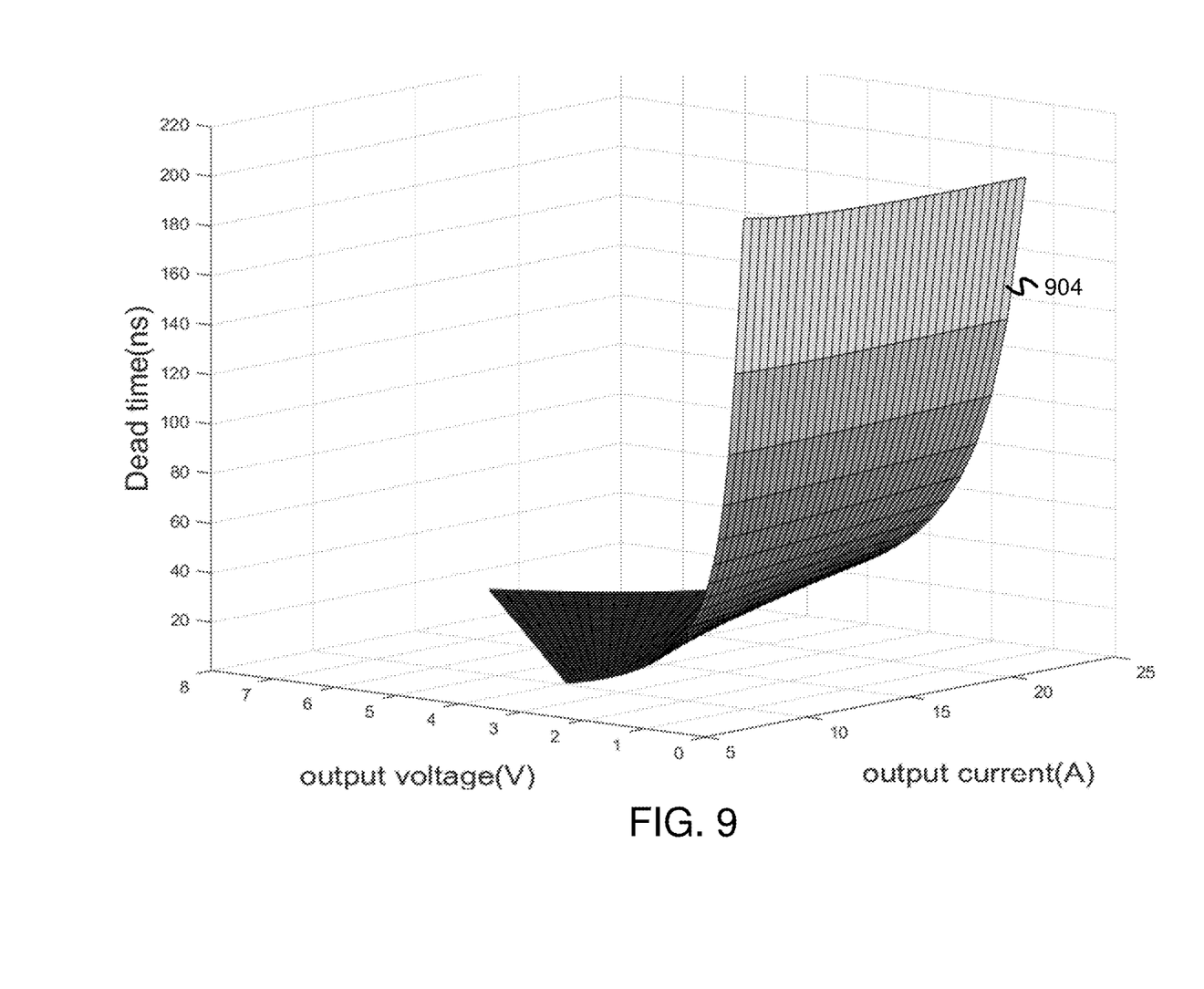
FIG. 9 is a plot of the second function to obtain the optimal dead time.

FIG. 9 is a plot of the second function to obtain the optimal dead time. The optimal dead time is calculated as a second function of the output current IOUT and the output voltage VOUT. Surface 904 of the second function results shows that the optimal dead time needed is higher for lower output voltages VOUT, and for lower output currents IOUT.

The result values of the second function are obtained by circuit simulation of FIG. 10 or using equations (1) an (4), shown later. The optimal dead times are the time required to fully charge and discharge the parasitic drain-to-source capacitances in the GaN transistors in the SMPS circuit. Higher output voltages VOUT strongly reduce the optimal dead time. Thus the dead time can be reduced as the SMPS starts up as VOUT rises.

Figure 10:
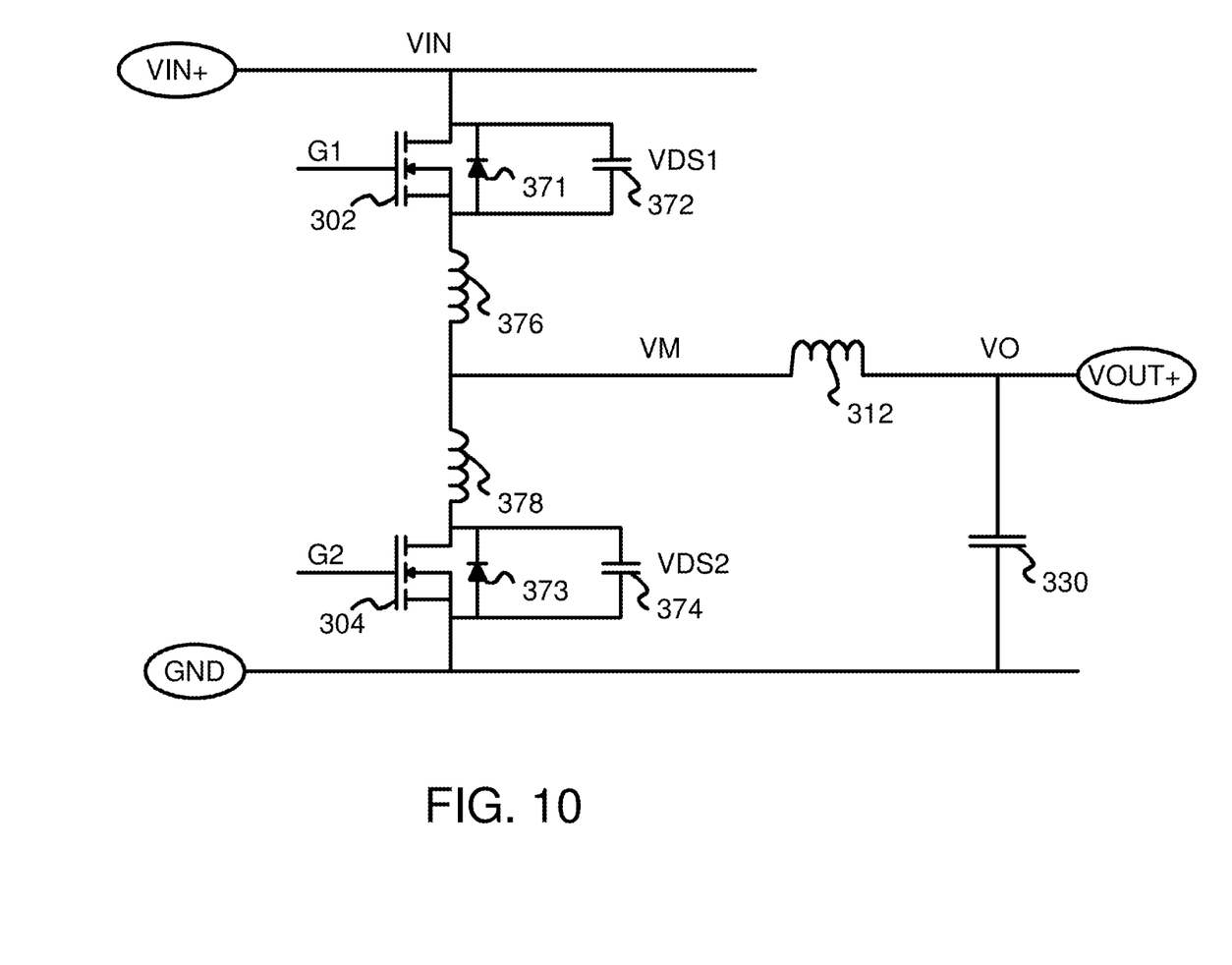
FIG. 10 is a schematic of parasitics in a buck converter in a SMPS.

FIG. 10 is a schematic of parasitics in a buck converter in a SMPS. Only GaN transistors 302, 304 are shown in this simplification of the interleaved buck converter of FIG. 1. GaN transistors 302, 304 drive current to middle node VM and then through inductor 312 to charge output capacitor 330 that generates output voltage VOUT.

GaN transistor 302 receives G1 from the controller at its gate and has parasitic drain-source inductor 376 in series with its channel current path. Parasitic capacitor 372 is charged when transistor 302 is off and discharged when transistor 302 is turned on. Diode 371 allows reverse current to flow when VM is more than a diode turn-on voltage above VIN. Additional parasitic inductors (not shown) to the supplies may be present, on the drain of transistor 302 and on the source of transistor 304.

GaN transistor 304 receives G2 from the controller at its gate and has parasitic drain-source inductor 378 in series with its channel current path. Parasitic capacitor 374 is charged when transistor 304 is off and discharged when transistor 304 is turned on. GaN transistor 304 has a diode-like behavior that is modeled by diode 373 that allows reverse current to flow when VM is more than a diode turn-on voltage below ground.

A circuit simulation of FIG. 10 can be performed to obtain the initial dead time (FIG. 8) or the optimal dead time (FIG. 9). These dead times are the time required to fully charge and discharge the parasitic drain-to-source capacitances, parasitic capacitor 372 and parasitic capacitor 374.

During start-up, the duty cycle is low. This means that transistor 302 is off most the time and transistor 304 is on most the time. When transistor 302 is on and transistor 304 is off, C2 capacitor 374 starts charging. However, due to the short on time of transistor 302, C2 capacitor 374 is charged to a low Vds and the Coss is large (MOS characteristic in low Vds). During the dead time (transistors 302, 304 are both off), C1 capacitor 372 is charging and C2 capacitor 374 is discharging. Due to the large Coss of transistor 304, transistor 304 needs a larger deadtime to discharge. If the dead time is not large enough, C2 capacitor 374 is not fully discharged or C1 capacitor 372 is not fully charged. Then when transistor 302 is off and transistor 304 is turned on, at that time the ringing may occur.

The equations here are to simulate the optimal dead time during every stage of startup:

The dead times can also be calculated with the following equations:

$$I\_L(t) := \frac{V_{in} - V_o}{2L_o} \cdot t_{on} - \frac{V_o}{L_o} \cdot t \quad (1)$$

$$V_{C1}(t) := \frac{1}{C_{oss}} \cdot \int_0^t I\_L(t)dt \quad (2)$$

Where I_L is the load current through inductor 312, $L_o$ is the inductance of inductor 312, $V_o$ is the output voltage, $V_{in}$ is input voltage VIN, t is the dead time in seconds, and $t_{on}$ is the duty cycle expressed as the high pulse width of G1. $C_{oss}$ is the parasitic drain-to-source capacitance of GaN transistor 302 and $V_{C1}$ is the drain-to-source voltage across transistor 302.

The first term in eqn(1) is from the inductor equation V=Ldi/dt, and the second term in eqn(1) is the integral of the capacitor equation I=CdV/dt, or V=1/C(int(V)dt.

By substituting eqn(1) into eqn(2) and solving the integration in equation 2, we have:

$$Vc1 = -\frac{Vo}{2Lo}t^2 + \frac{(Vin - Vo)ton}{2LoCoss}t \quad (3)$$

In the curve of FIG. 8 for initial dead time as a function of (Vin, initial duty), we assume that Vc1=Vin as our target charging voltage of Vc1=Vin. During startup, Vo is a low voltage so we set Vo to 0.1V. Then we have a second order equation, and Lo and Coss are known from circuit and MOS data sheets or specifications.

$$-\frac{Vo}{2Lo}t^2 + \frac{(Vin - Vo)ton}{2LoCoss}t - Vin = 0 \quad (4)$$

Then from equation 4, we can plot the relationship of Vin, initial duty (ton) and dead time t.

In the curve of FIG. 9 for optimal dead time as a function of (Vout, Iout), we assume Vin is fixed, only the duty cycle (ton) and Vo are varying. As output current Iout is equal to IL, we can express Iout as a function of ton and Vo as well from equation 1.

By solving equation 1 and 4, we can plot the relationship of Iout, Vout and dead time t, as shown in FIG. 9.

ALTERNATE EMBODIMENTS

Several other embodiments are contemplated by the inventors. For example other devices may be substituted for the GaN transistors as newer technologies become available to implement switching transistors. Additional components may be added, such as to better filter the input or output. Different types of capacitors may be used. For the inductor, different core materials and winding methods can be used.

While n-channel transistors have been described, p-channel transistors could also be used with inverted gate signals. Complementary p and n channel devices could be used for pull-up and pull-down transistors.

While a synchronous buck converter has been shown, other kinds of power circuits could be substituted, such as LLC. A half bridge or a full bridge converter may be used with a bridge switch (high side and bottom side switch). These circuit may use other values for the initial duty cycle, such as 50% for LLC rather than 1% for buck converters.

Different values of VIN, VOUT, IOUT, duty, and dead time could be substituted, and targets may have different values. For example, the fixed frequency may be 400 kHz, the initial duty cycle 1%, the initial dead time 200 ns, the final optimal dead time 40 ns, which is also used for normal operating mode. VIN can be 50v and the final target Vout 12v, with VSET1 of 3v when the first loop ends, and VSET2 being 12v, when the second loop ends and normal operating mode starts.

Other sensing and control components may be added, such as to measure currents or voltages for power control systems that might adjust the duty cycle of G1-G4, as one example. Some power converters may have only transistors 302, 304 but not transistors 306, 308. Other variations of the power converter circuit are possible The waveforms are ideal and simplified for easier understanding. Actual waveforms, whether measured or simulated, can be much more complex, with additional inflexions and wiggles.

The duty cycle can be increased by 1% for each iteration, or by some other amount such as 0.1%, 0.5%, 2%, or other values. The duty cycle can be increased linearly over time rather than in discrete steps. For example, when the duty cycle is increased from D1 to D2 in step 232 (FIG. 7B), the duty cycle can be increased by (D2−D1)/C for each of C clock periods during operation in step 234. The increase in duty cycle can be small for each loop, such as by 1%, and many loops used. The dead time may be decreased in a similar fashion over a period of time.

While increasing the duty cycle linearly has been described, this increase could be a Piece-Wise-Linear (PWL) increase with multiple linear segments. There may be flat times when the duty cycle is not increasing between increasing periods. The rate of increase can vary. Thus the curves for the duty cycle and for the dead time could me more complex that that shown in the simplified waveforms.

Fully charged does not have to refer to being 100% charged, but could be a smaller value such as 90%. The RC time constant may be used to define capacitor charging. For 1×RC, the capacitor can charge to 63%; for 4×RC, the capacitor can charge to 98%. A value of 4×RC can be treated as fully charged. Fully charged could refer to a time to reach a target voltage between the drain and source. Guard bands or buffer amounts could be added to the calculated dead times to allow for better protection against ringing under different conditions.

While equations have been presented that can be solved to obtain the results plotted in FIGS. 8, 9, these results could also be obtained by more careful circuit simulation including the effects of various parasitic components such as shown in FIG. 10 for the GaN transistors. Alternately, these results could be generated with a low-order model or a simplified model. Known values may be substituted into these models to further simplify generating the dead time result. For example, the initial dead time is a function of the initial duty cycle and the measured input voltage VIN. The initial duty cycle could be set in firmware and thus be known, reducing the first function to a function of only 1 variable, VIN. It could be assumed that VIN is stable after waiting out the CD delay, and that stable VIN value could be known. Then the initial dead time would be known for that value of VIN. The first function could simply return this pre-calculated value of the initial dead time. Firmware could be programmed with this initial dead time, or a larger value of dead time to allow for fluctuations in VIN. Thus the initial dead time could be pre-determined so that accessing the first graph of FIG. 8 during real runtime is not needed, nor is executing the first function. An approximate value of the initial dead time could suffice. The first function could be approximated as being independent of VIN and only a function of initial duty cycle. If the initial duty cycle is large enough, VIN has less effect. However, when the initial duty cycle is low (<1%), VIN has a significant effect and this approximation is not useful.

The optimal dead time could be pre-computed for several combinations of VOUT and IOUT, and a closest one of these VOUT, IOUT combinations be selected based on the actual VOUT, IOUT measured, and the pre-computed optimal dead time for this closest pre-computed point be used. The more pre-computed points that are used, the better the accuracy and efficiency of the SMPS. These pre-computed points could have their optimal dead time results stored in a lookup table.

The optimal dead time could be re-calculated or adjusted for each iteration of the second loop, or at a lower rate such as after each 5 iterations, etc. The duty cycle could be adjusted at the same rate as adjustments of the optimal duty cycle, or at faster or slower rates. Various re-arrangements of the steps in FIGS. 7A-7B could be made along with other substitutions and modifications to the process.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method to start a Switched-Mode Power Supply (SMPS) comprising:

waiting at power-up until an input voltage reaches a first target voltage;

setting a duty cycle to an initial duty cycle;

generating an initial dead time from the input voltage and from the initial duty cycle;

(a) generating a first switching signal and a second switching signal having a fixed frequency, and generating the first switching signal with the duty cycle, and generating the first switching signal and the second switching signal with the initial dead time between a de-activating edge of the first switching signal and an activating edge of the second switching signal, wherein the first switching signal and the second switching signal are complementary and non-overlapping due to the initial dead time;

applying the first switching signal to a gate of a pull-up transistor that conducts current between the input voltage and a middle node that drives an output capacitor through an inductor to generate an output voltage;

applying the second switching signal to a gate of a pull-down transistor that conducts current between a ground and the middle node that drives the output capacitor through the inductor to generate the output voltage;

comparing the output voltage to a first setting and increasing the duty cycle and repeating from (a) when the output voltage is below the first setting;

when the output voltage is no longer below the first setting:

(b) measuring the output voltage and an output current;

obtaining an optimal dead time using the output voltage and the output current;

increasing the duty cycle;

generating the first switching signal and the second switching signal having the fixed frequency, and generating the first switching signal with the duty cycle, and generating the first switching signal and the second switching signal with the optimal dead time between the de-activating edge of the first switching signal and the activating edge of the second switching signal, wherein the first switching signal and the second switching signal are complementary and non-overlapping due to the optimal dead time;

applying the first switching signal to the gate of the pull-up transistor;

applying the second switching signal to the gate of the pull-down transistor;

comparing the output voltage to a second setting and repeating from (b) when the output voltage is below the second setting; and operating the SMPS in a normal operating mode using the duty cycle and optimal dead time to generate the first switching signal and the second switching signal when the output voltage is no longer below the second setting.

2. The method of claim 1 wherein the optimal dead time is less than the initial dead time.

3. The method of claim 2 wherein the second setting is a target output voltage for the normal operating mode of the SMPS.

4. The method of claim 2 wherein the initial dead time is sufficient to discharge a parasitic drain-to-source capacitance in the pull-down transistor.

5. The method of claim 2 wherein the initial dead time is sufficient to eliminate ringing in the pull-down transistor;

wherein the optimal dead time is shorter than the initial dead time and the optimal dead time is short enough to cause ringing of the pull-down transistor to occur under initial conditions of the input voltage, duty cycle, and output voltage, whereby ringing under initial conditions is avoided while still using the optimal dead time for efficiency during the normal operating mode.

6. The method of claim 5 wherein the duty cycle is increased linearly over a period of time.

7. The method of claim 5 wherein when the optimal dead time is decreased, the optimal dead time is decreased linearly over successive iterations of a second loop starting at (b), wherein the optimal dead time is successively and linearly reduced.

8. The method of claim 2 wherein the optimal dead time during the normal operating mode is less than one-fourth the initial dead time.

9. The method of claim 2 further comprising:

generating a third switching signal that is 180 degrees phase delayed from the first switching signal;

generating a fourth switching signal that is 180 degrees phase delayed from the second switching signal;

applying the third switching signal to a gate of a second pull-up transistor that conducts current between the input voltage and a second middle node that drives the output capacitor through a second inductor to further generate the output voltage;

applying the fourth switching signal to a gate of a second pull-down transistor that conducts current between the ground and the second middle node.

10. The method of claim 2 further comprising:

waiting an additional delay after the input voltage reaches the first target voltage before (a) generating the first switching signal and the second switching signal.

11. The method of claim 2 wherein obtaining an optimal dead time using the output voltage and the output current further comprises:

reading a second lookup table that is indexed by the output voltage and by the output current, the second lookup table returning the optimal dead time as a stored result.

12. The method of claim 11 wherein the optimal dead times stored in the second lookup table are pre-computed to be an amount of time needed to discharge a parasitic drain-to-source capacitance in the pull-down transistor.

13. The method of claim 11 wherein generating an initial dead time from the input voltage and from the initial duty cycle further comprises:

reading a first lookup table that is indexed by the input voltage and by the initial duty cycle, the first lookup table returning the initial dead time as a stored result.

14. The method of claim 13 wherein the initial dead times stored in the first lookup table are pre-computed to be an amount of time needed to discharge a parasitic drain-to-source capacitance in the pull-down transistor.

* * * * *